(No Model.)

J. B. HOLMES.
TWINE REEL.

No. 447,153. Patented Feb. 24, 1891.

WITNESSES:
INVENTOR:
J. B. Holmes
BY Munn & Co.
ATTORNEYS.

United States Patent Office.

JOHN B. HOLMES, OF NEW YORK, N. Y.

TWINE-REEL.

SPECIFICATION forming part of Letters Patent No. 447,153, dated February 24, 1891.

Application filed September 24, 1889. Serial No. 324,903. (No model.)

*To all whom it may concern:*

Be it known that I, JOHN B. HOLMES, of the city, county, and State of New York, have invented a new and Improved Twine-Reel, of which the following is a full, clear, and exact description.

The invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
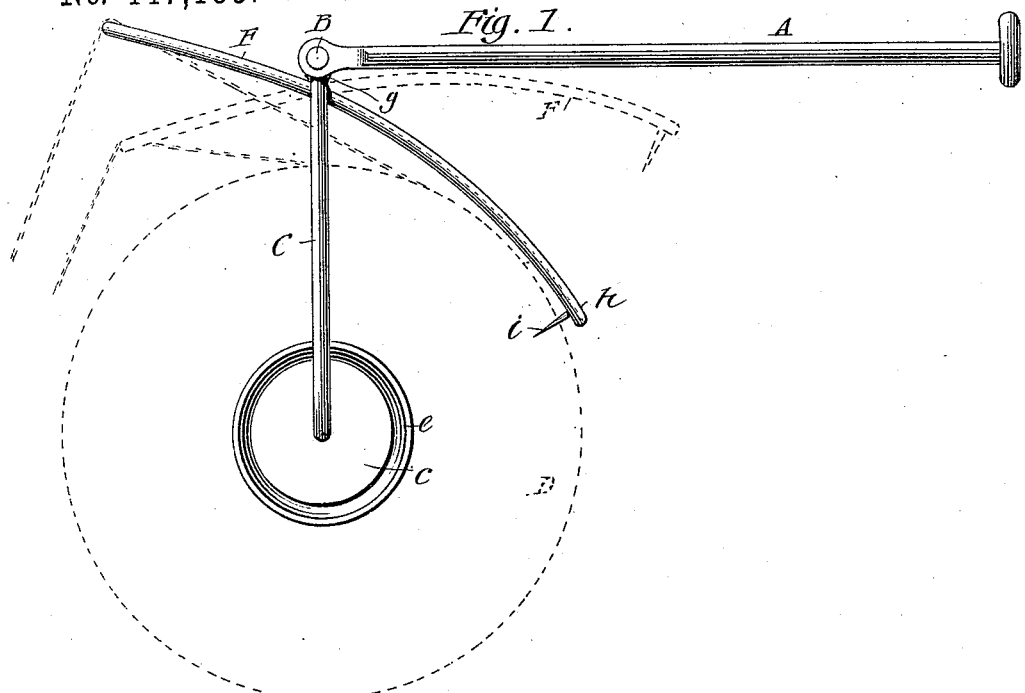
Figure 2:
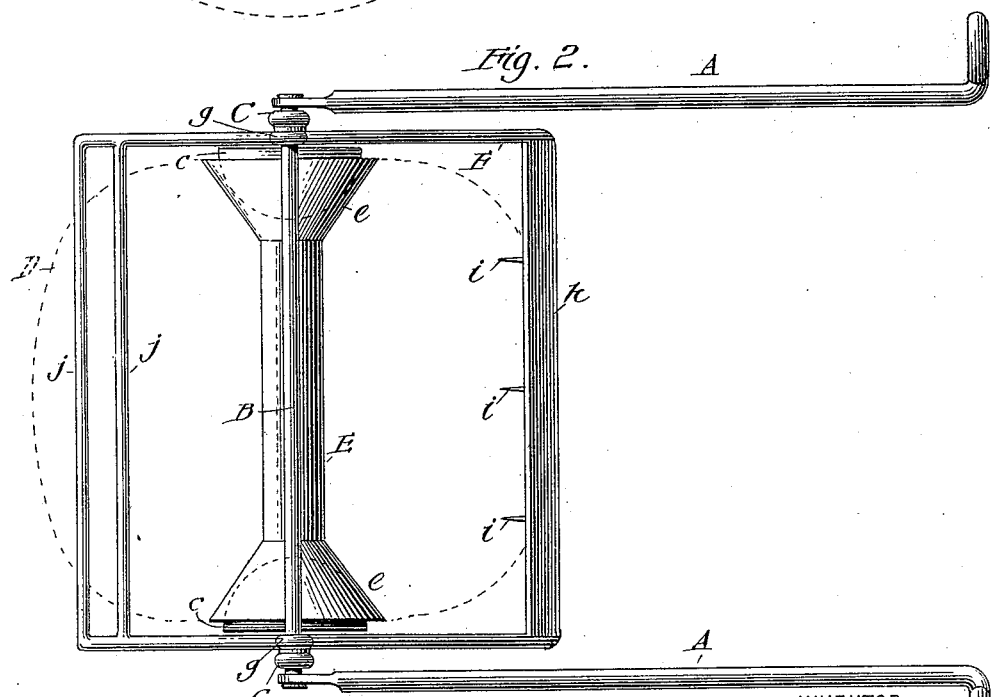
Figure 3:
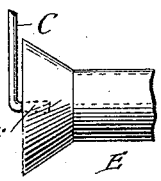

Figure 1 is a side elevation of my new and improved twine-reel, showing the ball in dotted lines and the retainer in full lines in position of contact with the ball and in dotted lines out of contact with the ball. Fig. 2 is a plan view of the holder, and Fig. 3 shows a modification in detail.

A A represent arms which may be attached to a wall, beam, base, or other support. These arms hold the horizontal cross-piece B, from which depend the holding-arms C C, which hold the ball of twine D. In Figs. 1 and 2 the said holding-arms C are each provided at the lower end with a conical block $c$ to fit in the funnel-shaped ends $e$ of the spool E, on which the twine is wound. The spool E is by preference made of paper. In case a common wooden spool is used the lower ends of the holding-arms C will be simply turned inward to form a stud $f$ to enter the spool, as shown in Fig. 3. The said holding-arms are by preference rigidly secured to the cross-piece B, so that they may have sufficient spring action to hold the ball and permit spreading for the insertion of the ball of twine. The said cross-piece B turns in the arms A A, so that no matter what position the arms A may assume the holding-arms C will always be vertical.

F is the brake or retainer for the ball of twine. It comprises a frame pivoted by means of eyes $g$ $g$ to the cross-piece B. The rear plate $h$ is provided with one or more points $i$ to normally penetrate the ball of twine, as indicated in Fig. 1 in full lines, for holding the ball from turning. Opposite the plate $h$ are the two parallel rods $j$ $j$, between which the end of the twine is passed from the ball, as shown in dotted lines in Fig. 1. The retainer is overbalanced at the rear, so that when there is no stress on the line of twine the points $i$ drop in contact with the ball and hold it, while the parallel rods $j$ $j$ are correspondingly elevated, as shown in full lines in Fig. 1. Now when a piece of twine is to be removed from the ball for use the end is pulled downward, which first tips the retainer to the position shown in dotted lines in Fig. 1, which lifts the points $i$ out of contact with the ball, leaving it free to turn to give off the amount of twine desired. When the twine drawn off is cut and the line released, the retainer will instantly drop of its own weight at the rear and engage the points $i$ with the ball, and thus retain it until more is to be drawn off, when the operation will be repeated. In this manner the ball is prevented from giving off twine, except to the amount which is drawn off, and all unwinding and tangling is prevented and much twine is saved.

Having thus described my invention, what I claim as new, and desire to secure by Letters Patent, is—

1. In a twine-reel, the combination of a frame having vertical arms forming at their lower ends a support on which the ball may turn, and a second frame pivoted to the upper end of said first-named frame to swing in the vertical plane and having a cross-bar at its heavier end, said heavier end having normally a tendency to gravitate in the direction of the vertical arms of the ball-supporting frame, substantially as described.

2. In a twine-reel, the combination of a frame having vertical arms forming a support for a ball of twine, and a second frame pivoted at the upper end of said first-named frame and having a cross-bar at one end, provided on the under side with spurs for entering the ball of twine, substantially as described.

3. The combination, in a twine-reel, of a frame consisting of a cross-bar and vertical arms, the latter forming a support for the ball of twine, and a cord-controlling frame pivoted at the upper end of the said first-named frame, one end of the said second frame having an eye or opening forming a guide for the cord, and the opposite heavier end having a transversely-ranging bar and normally tending to gravitate in the direction of the vertical ball-supporting arms, substantially as described.

4. The combination, in a twine-reel, of a supporting-frame for the ball of cord, and a second frame pivoted to the first-named frame for movement in the vertical plane, said second frame having an eye or opening at one end forming a guide for the cord and having a spurred cross-bar at the opposite heavier end, substantially as described.

5. The combination, with the bracket-arms A A, of a twine-supporting frame pivoted to said arms A A and consisting of a cross-bar having depending arms that form at their lower ends a support for a ball of twine, and a cord-controlling frame pivoted to the cross-bar of said first-named frame for vertical movement and formed at its heavier end with a cross-bar having spurs on its under side, the said heavier end of the cord-controlling frame normally tending to gravitate in the direction of the vertical arms of the ball-supporting frame, whereby its spurred cross-bar will act as a stop for the ball, substantially as described.

JOHN B. HOLMES.

Witnesses:
H. A. WEST,
C. SEDGWICK.